(12) United States Patent
Mehra et al.

(10) Patent No.: US 8,560,578 B2
(45) Date of Patent: Oct. 15, 2013

(54) COMMON BLOCK STORAGE INFRASTRUCTURE

(75) Inventors: Karan Mehra, Sammamish, WA (US); Scott A. Brender, Kirkland, WA (US); William R. Tipton, Seattle, WA (US); Darren G. Moss, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 575 days.

(21) Appl. No.: 12/147,095

(22) Filed: Jun. 26, 2008

(65) Prior Publication Data

US 2009/0327367 A1 Dec. 31, 2009

(51) Int. Cl.
*G06F 17/30* (2006.01)
*G06F 11/14* (2006.01)
*G06F 13/14* (2006.01)

(52) U.S. Cl.
USPC .......................................................... 707/822

(58) Field of Classification Search
USPC ............ 707/999.205, 999.001, 999.006, 1/1, 707/999.01, 999.2, 999.202–206, 689, 749, 707/821–822, 704; 711/103, 115, 114, 156, 711/162–165, 111–113, 169, 170–173; 709/203; 705/35–37; 380/28
See application file for complete search history.

(56) References Cited

U.S. PATENT DOCUMENTS

| | | | |
|---|---|---|---|
| 5,778,168 A | | 7/1998 | Fuller |
| 6,505,286 B1 * | | 1/2003 | Kingsbury et al. ........... 711/170 |
| 6,636,871 B1 | | 10/2003 | Rafanello |
| 6,883,114 B2 | | 4/2005 | Lasser |
| 6,904,599 B1 | | 6/2005 | Cabrera |
| 7,146,524 B2 | | 12/2006 | Patel |
| 7,158,991 B2 | | 1/2007 | Kekre |
| 7,236,987 B1 | | 6/2007 | Faulkner |
| 7,272,613 B2 | | 9/2007 | Sim |
| 7,308,463 B2 * | | 12/2007 | Taulbee et al. ........................ 1/1 |
| 2005/0050236 A1 * | | 3/2005 | Zeryck et al. ..................... 710/8 |
| 2006/0036825 A1 * | | 2/2006 | Maki et al. ..................... 711/165 |
| 2009/0196414 A1 * | | 8/2009 | Mittal et al. ..................... 380/28 |
| 2009/0307461 A1 * | | 12/2009 | Nevarez et al. ............... 711/203 |

OTHER PUBLICATIONS

Simpson, Nik "Infostor", Retrieved from http://www.infostor.com/Articles/Article_Display.cfm?Section=Articles&Subsection=Display&ARTICLE_ID=164016 on Mar. 13, 2008., 7 Pages.

(Continued)

*Primary Examiner* — Usmaan Saeed
*Assistant Examiner* — Cecile Vo
(74) *Attorney, Agent, or Firm* — Wolfe-SBMC

(57) ABSTRACT

Common block storage infrastructure techniques are described in which files are created through interaction with a file system to reserve extents in a volume on behalf of volume storage drivers, which may form a driver stack that resides logically on top of the volume. The files protect the reserved extents within the volume for use by the volume storage drivers, such as to store metadata related to operations performed by the drivers. When reserved extents are created, a location of the reserved extents is communicated through the driver stack to a corresponding volume storage driver. Volume storage drivers may also be configured to discover their corresponding reserved extents and communicate these to upper-level drivers and components. Accordingly, when a volume storage driver manipulates data in the volume, it may do so with awareness of the reserved extents of the other volume storage drivers.

18 Claims, 5 Drawing Sheets

(56) References Cited

OTHER PUBLICATIONS

Corry, Kevin et al., "Volume Management in Linux with EVMS", Retrieved from http://evms.sourceforge.net/presentations/evms-utexas-lecture-2003.pdf., 44 Pages.

Flouis, Michai D., "Violin: A Framework for Extensible Block-Level Storage", Retrieved from http://www.ics.forth.gr/carv/scalable/publications/violin_Incs06.pdf., 15 Pages.

Hendrickson, B. Winston "Mactech", Retrieved from http://www.mactech.com/articles/develop/issue_22/copland.html on Mar. 12, 2008., 8 Pages.

Yang, Yin et al., "VSVM-enhanced: a Volume Manager Based on the EVMS Framework", Retrieved from http://ieeexplore.ieee.org/iel5/4031510/4031511/04031586.pdf?tp=&isnumber=&arnumber=4031586., 8 Pages.

\* cited by examiner

COMMON BLOCK STORAGE INFRASTRUCTURE

BACKGROUND

A file system may be implemented by an operating system to define and manage a volume, such as determining how files are named, stored, organized, allocated, or otherwise managed on the volume. Allocation of space on a volume by components down-level of the file system may be unsafe. For instance, uncoordinated attempts by the file system and down-level components to allocate or operate upon the same space in the volume may result in data corruption, deadlocks, and/or loss of the volume.

SUMMARY

Common block storage infrastructure techniques are described in which files are created through interaction with a file system to reserve extents in a volume on behalf of volume storage drivers, which may form a driver stack that resides logically on top of the volume. The files protect the reserved extents within the volume for use by the volume storage drivers, such as to store metadata related to operations performed by the drivers. When reserved extents are created, a location of the reserved extents is communicated through the driver stack to a corresponding volume storage driver. Volume storage drivers may also be configured to discover their corresponding reserved extents and communicate these to upper-level drivers and components. Accordingly, when a volume storage driver manipulates data in the volume, it may do so with awareness of the reserved extents of the other volume storage drivers.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Allocation of space on a volume by components down-level of the file system may be unsafe. For instance, uncoordinated attempts by the file system and down-level components to allocate or operate upon the same space in the volume may result in data corruption, deadlocks, and/or loss of the volume.

Common block storage infrastructure (CBSI) techniques are described herein which may be used to safely allocate, coordinate, protect, and manage reserved extents in a volume. CBSI techniques further provide mechanisms for volume storage drivers to discover their corresponding reserved extents and communicate the reserved extents one to another. CBSI techniques may be employed to avoid situations in which one volume storage driver attempts to reserve or operate upon reserved extents of another volume storage driver.

For example, applications may cause a CBSI module to interact with the file system to reserve extents on behalf of corresponding volume storage drivers. CBSI module may then communicate with the volume storage drivers through a driver stack to inform them of the reserved extents. Volume storage drivers may also be configured to discover their own reserved extents and to communicate these upstream to upper-level drivers and to the CBSI module. Accordingly, when a volume storage driver manipulates data in the volume, it may do so with awareness of the reserved extents of the other volume storage drivers. The volume storage drivers may be configured to adhere to a variety CBSI rules to coordinate with other volume storage drivers and to avoid operating on reserved extents corresponding to the other volume storage drivers.

In the following discussion, an example environment is first described that is operable to perform common block storage infrastructure techniques. Example procedures are then described that may be employed in the example environment, as well as in other environments. Although these techniques are described as employed within an example computing environment in the following discussion, it should be readily apparent that these techniques may be incorporated within a variety of environments without departing from the spirit and scope thereof.

Example Environment

Figure 1:
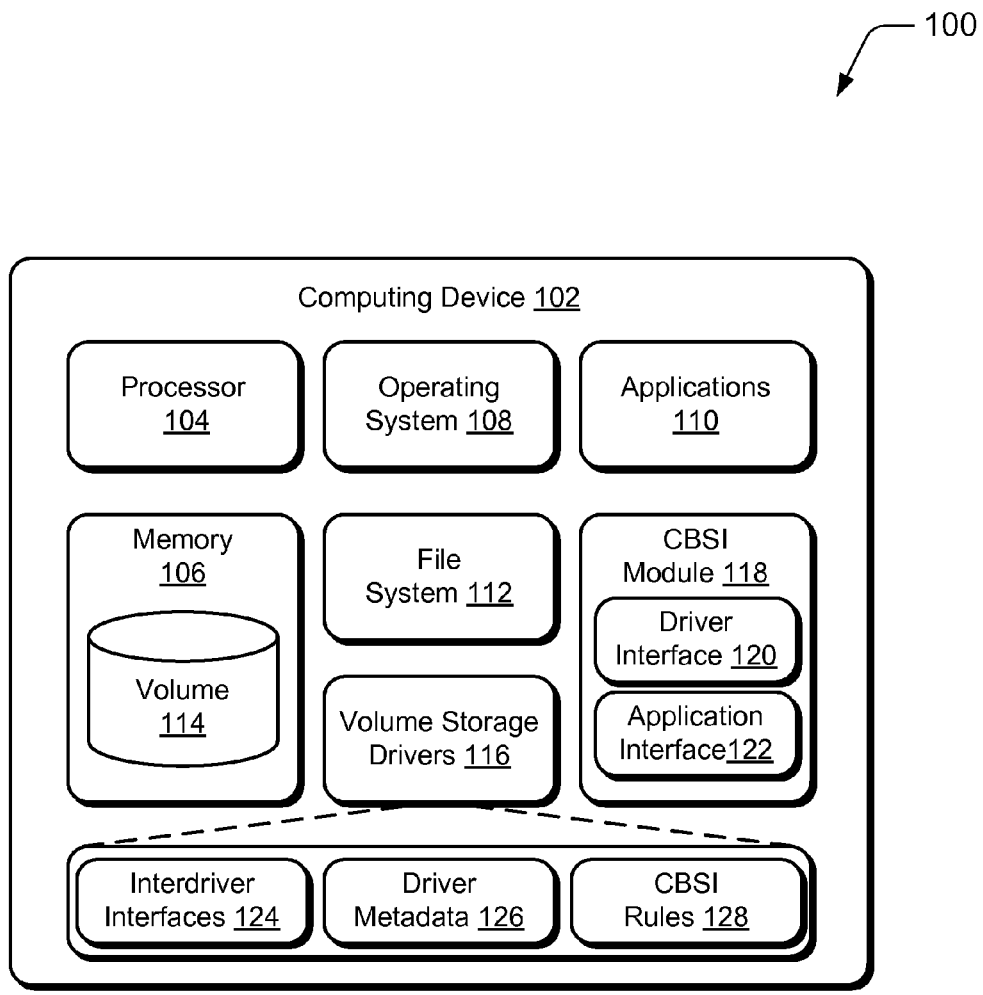
FIG. 1 depicts an example environment in which common block storage infrastructure techniques may be employed.

FIG. 1 is an illustration of an environment 100 in an example implementation that is operable to employ common block storage infrastructure (CBSI) techniques described herein. The illustrated environment 100 includes a computing device 102 having one or more processors 104 and a memory 106. Computing device 102 may be configured in a variety of ways. For example, computing device 102 may be configured as a computer that is capable of communicating over a network, such as a desktop computer, a mobile station, a laptop, an entertainment appliance, a set-top box communicatively coupled to a display device, a wireless phone, a game console, and so forth. In the following description a referenced component, such as computing device 102, may refer to one or more entities. Therefore, by convention, reference may be made to a single entity (e.g., the computing device 102) or multiple entities (e.g., the computing devices 102, the plurality of computing devices 102, and so on) using the same reference number.

Processors 104 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. The one or more processors 104 may perform single threaded and multi-threaded operations. Additionally, although a single memory 106 is shown for the computing device 102, a wide variety of types and combinations of computer readable memories may be employed including volatile and non-volatile memory and/or storage media. For example, computer-readable memories/media may include but are not limited to random access memory (RAM), hard disk memory, read only memory (ROM), flash memory, video memory, removable medium memory, and other types of computer-readable memories/media that are typically associated with a computing device 102 to store data, executable instructions, and the like.

The computing device 102 is further illustrated as including an operating system 108 and a variety of applications 110. The one or more processors 104 may retrieve and execute computer-program instructions from applications 110 to provide a wide range of functionality to the computing device 102, including but not limited to office productivity, email, media management, printing, networking, web-browsing, and so forth. A variety of data and program files related to the applications 110 are contemplated, examples of which include office documents, multimedia files, emails, data files, web pages, user profile and/or preference data, and so forth.

Computing device 102 may also include various interfaces through which applications 110 may interact with the operating system 108, common resources, dynamic link libraries (DLLs), network resources (content and services), and so forth. Interfaces may include a network interface through which application 110 may engage in various network interactions over a network (not shown) accessible to the computing device 102. Interfaces may also include one or more application programming interfaces (APIs) providing core tools and functions that may be used to take advantage of the functionality of the operating system 108. Generally, APIs represent interfaces that various applications 110 may call to take advantage of various tools, resources, features, services, and so forth provided via the operating system 108. A variety of other examples are also contemplated.

Computing device 102 is also depicted as including a file system 112. File system 112 may be implemented by the operating system 108 to organize memory 106 or partitions of the memory 106, such as to store and organize data and program files. File system 112 is representative of functionality that determines how files are named, stored, and organized in memory 106. The file system 112 is operable to manage files and folders, and the information needed to locate and access these items by local and remote users.

In particular, one or more partitions of memory 106 may be organized logically into a volume 114 as depicted in FIG. 1. The volume 114 may be arranged in accordance with the file system 112. The file system 112 may own the volume 114 and is configured to recognize and mount the volume 114 when the computing device 102 boots (e.g., during a boot or start-up sequence). The file system 112 may then expose the volume 114 to applications 110 through various components to facilitate storing, locating, and accessing different data and program files on the volume 114. The volume 114 represents a logical organization of one or more partitions of memory 106. Volume 114 may extend across multiple physical devices (e.g., multiple hard drives, flash drive, and the like). File system 112 may use various data storage devices to define the volume 114, such as a hard disk, removable optical disks, flash memory, and/or other suitable storage.

The volume 114 may be accessible via a plurality of volume storage drivers 116. The volume storage drivers 116 represent functionality operable to manipulate, transform, read/write or otherwise operate upon the volume 114 in a variety of ways. Volume storage drivers 116 may be configured to form a driver stack that is logically positioned between applications 110 and volume storage 114. In the course of the discussion, reference may be made to relative positions of volume storage drivers 116 in a driver stack. In this context, upper-level drivers may be higher in the stack and logically closer to the applications 110 (e.g., software) relative to lower-level drivers that may be lower in the stack and closer to the volume 114 (e.g., hardware). Examples of volume storage drivers 116 include but are not limited to: a volume snapshot driver, a write aggregation driver, and an encryption driver. The volume snapshot driver may perform copy on write operations to store differences in the volume 114 (e.g., volume snapshots) between points in time. Such volume snapshots may enable backup and restore operations for the volume 114. Encryption driver may be implemented to store encrypted key blobs on the volume 114 and to encrypt/decrypt the data on the volume 114. The write aggregation driver may be configured to maintain a write log and remap writes to various locations in the volume 114. A variety of other drivers are also contemplated.

The above example drivers, as well as other volume storage drivers 116, may form a driver stack logically between the file system 112 and the volume 114. They may also be configured to operate independently of the file system 112. For instance, volume storage drivers 116 may perform functions before the file system 112 is mounted or "online", such as reading and writing to the volume 114. To enable volume storage drivers 116 to operate independently of the file system 112, the volume storage drivers 116 may carve out space in the volume 114. The volume storage drivers 116 may then store data in this carved out space to enable operations on the volume 114. Space that is carved out in the volume 114 for use by a volume storage driver 114 may be referred to herein as reserved extents. Reserved extents may be configured as one or more continuous areas or blocks of space in the volume 114. The following discussion describes a variety of example techniques related to creation and management of reserved extents for volume storage drivers 116.

In particular, common block storage infrastructure techniques are described herein which may be used to safely allocate, coordinate, protect, and manage reserved extents in a volume 114. Common block storage infrastructure techniques further provide mechanisms for volume storage drivers 116 to discover their corresponding reserved extents and communicate the reserved extents to other components. Common block storage infrastructure techniques may be employed to avoid situations in which one volume storage driver 116 attempts to reserve or operate upon reserved extents of another volume storage driver 116, which may lead to data corruption and/or loss of the volume 114.

For instance, computing device 102 is depicted as including a common block storage infrastructure (CBSI) module 118. CBSI module 118 is representative of variety of functionality, tools, and techniques related to interaction with volume 114 and/or creation and management of reserved extents for volume storage drivers 116. Further, CBSI module 118 enables applications 110 to reserve extents in a volume 114 that is owned by the file system 112.

For instance, CBSI module 118 may expose a driver interface 120 and an application interface 122 to enable operations by applications 110 on the volume 114. Driver interface 120 is representative of functionality to enable communication between the CBSI module 118 and the plurality of volume storage drivers 116 in accordance with common block storage infrastructure. Additionally, CBSI module 118 may implement an application interface 122 through which applications 110 may invoke each of the plurality of volume storage drivers 116. Thus, CBSI module 118 facilitates communication between applications 110 and the plurality of volume storage drivers 116, and also among the plurality of volume storage drivers 116.

CBSI module 118 may be implemented as a file system filter that logically resides between the file system 112 and applications 110. While it is illustrated a stand-alone component, CBSI module 118 may also be integrated with the file system 112 and/or operating system 108. In an implementation, CBSI module 118 may be provided as a dynamic link library (DLL) of the operating system 108. In another example, CBSI module 118 is representative of an application programming interface (API) that is exposable by the operating system 108. A variety of other examples are also contemplated.

Volume storage drivers 116 are depicted as each providing one or more inter-driver interfaces 124 through which the plurality of volume storage drivers 116 may communicate one to another. Each of the volume storage drivers 116 also includes associated metadata 126. Metadata 126 may describe how the associated driver will operate on the data of the volume 114. Metadata 126 may be stored in reserved extents corresponding to the associated volume storage driver 116. Further, each of the volume storage drivers 116 may be configured to adhere to the plurality of CBSI rules 128. CBSI rules 128 are representative of a variety of rules, protocol and procedures that may be defined by the common block storage infrastructure. CBSI rules 128 may include both rules to coordinate reserving of extents with the file system 112 and rules to coordinate operation of the plurality of volume storage drivers 116.

In operation, applications 110 may communicate with the CBSI module 118 to cause interaction with the file system 112 to reserve extents in volume 114 on behalf of volume storage drivers 116. CBSI module 118 may then create the requested reserved extents via the file system 112. For instance CBSI module 118 may create files through interaction with the file system 112 to protect reserved extents within the volume 114. When CBSI module 118 creates the reserved extents in the volume 114, CBSI module 118 may communicate with the plurality of volume storage drivers 116 on the stack to inform them of the reserved extents. This communication may include communicating a location of the reserved extents to the appropriate volume storage driver 116 that corresponds to (e.g., "owns") the reserved extents, as well as informing the other volume storage drivers 116 of the reserved extents to avoid conflicts. Accordingly, when a volume storage driver 116 manipulates data in volume storage 114, it may do so with awareness the reserved extents of the other volume storage drivers 116.

The volume storage drivers 116 adhere to the CBSI rules 128 to coordinate with other volume storage drivers 116 and to avoid operating on reserved extents corresponding to the other volume storage drivers 116. Volume storage driver 116 are also configured to discover their own extents and to communicate these upstream to other volume storage drivers 116 and to the CBSI module 118. Further discussion of CBSI rules 128 may be found in relation to the following procedures.

Generally, the functions described herein can be implemented using software, firmware, hardware (e.g., fixed-logic circuitry), manual processing, or a combination of these implementations. The terms "module", "functionality", "engine" and "logic" as used herein generally represent software, firmware, hardware, or a combination thereof. In the case of a software implementation, for instance, the module, functionality, or logic represents program code that performs specified tasks when executed on a processor (e.g., CPU or CPUs). The program code can be stored in one or more computer-readable memory devices. The features of the techniques to provide common block storage infrastructure are platform independent, meaning that the techniques may be implemented on a variety of commercial computing platforms having a variety of processors.

Example Procedures

The following discussion describes techniques related to common block storage infrastructure that may be implemented utilizing the previously described environment, systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference may be made to the example environment 100 of FIG. 1.

Figure 2:
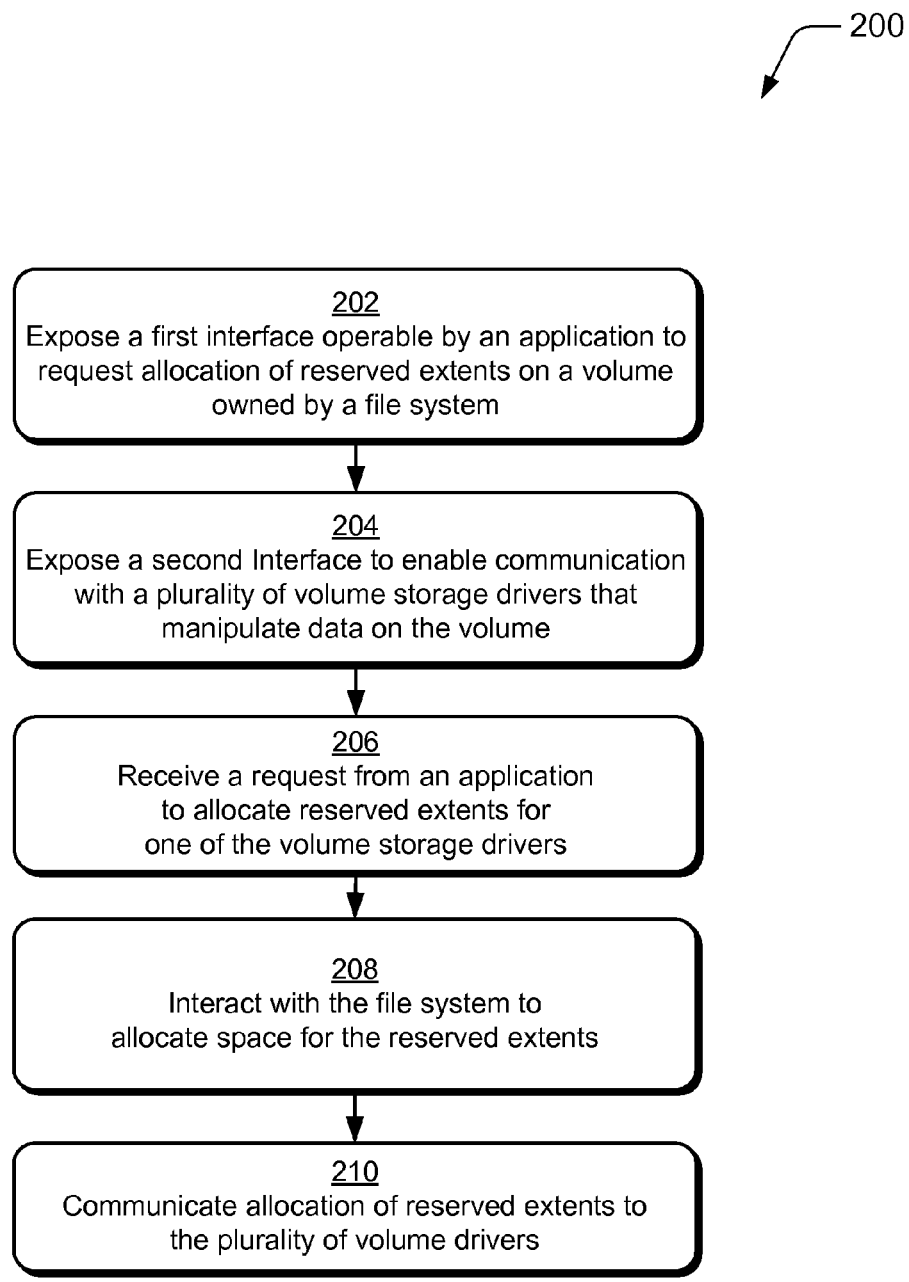
FIG. 2 depicts an example procedure in which reserved extents are allocated through interaction with a file system.

FIG. 2 depicts an example procedure 200 in which reserved extents are allocated in accordance with common block storage infrastructure techniques. A first interface is exposed that is operable by an application to request allocation of reserved extents on a volume owned by a file system (block 202). For example, CBSI module 118 may expose an application interface 122 that is operable by a variety of applications 110. Application interface 112 may be configured as an API or other suitable interface to enable communication between applications 110 and CBSI module 118. It is noted that each of the plurality of volume storage drivers 116 may have a companion application 110 that operates on its behalf to reserve extents through the CBSI module 118. CBSI module 118 provides mechanisms for the applications 110 to reserve space from the file system 112. CBSI module 118 further implements the common application interface 122 to enable applications 110 to perform operations on the volume 114. Through the application interface 122, CBSI module 118 may also inform an application 110 of existing reserved extents so that the application 110 may avoid operating on these regions of the volume 114.

Thus, the application interface 122 may enable application 110 to reserve extents and otherwise interact with a volume without awareness of the configuration of each individual volume storage driver 116 and/or awareness of the arrangement of the driver stack. This may be contrasted with traditional techniques in which each volume storage driver 116 was configured with its own interfaces, procedures, code, and protocols. To interoperate using traditional techniques, applications 110 were configured to be aware of the individual interfaces, procedures, code, and protocols of each volume storage driver 116, which added complexity to the applications and increased development time.

A second interface is exposed to enable communication with a plurality of volume storage drivers that manipulate data on the volume (block 204). For example, CBSI module 118 may expose a driver interface 120 to enable communication with the volume storage drivers 116. In an implementation, the driver interface 120 may be configured as an input/output control (IOTCL) interface. The driver interface 120 may operate in conjunction with the inter-driver interfaces 124 exposed by each of the plurality of volume storage drivers 116. The driver interface 120 enables the CBSI module 118 to send IOTCL commands through the driver stack for processing by the plurality of volume storage drivers 116. For example, during a boot sequence, CBSI module 118 may communicate a get-records command through the driver stack. Each volume storage driver 116 may respond by providing a list of its corresponding reserved extents to CBSI module 118. CBSI module 118 may then protect the extents by protecting the files that describe the extent via the file system 112. When CBSI module 118 determines that a reported extent is not protected (e.g., there is not a file describing the extent), CBSI module 118 may attempt to create a file via the file system 112 to describe it. Additionally or alternatively, CBSI module 118 may communicate a failure to protect a reserved extent to the plurality of volume storage drivers 116 so that the volume storage driver 116 that corresponds to (e.g., "owns") that extent may stop operating on the volume 114. A variety of other examples are also contemplated.

A request is received from an application to allocate reserved extents for one of the volume storage drivers (block 206). For instance, an application 110 that is associated with an encryption driver may communicate a request to allocate reserved extents in the volume 114. The request may be received through the application interface 122 by the CBSI module 118 which processes the request. CBSI module 118 may invoke the file system 112 to fulfill the request to allocate the reserved extents.

Interaction occurs with the file system to allocate space for the reserved extents (block 208). In the preceding example, CBSI module 118 interacts with the file system 112 to create files in the volume 114. The files act to protect areas of the volume 114 on behalf of the encryption driver. In other words, the files allocate and protect space for the reserved extents. It is noted that a unique identifier may be associated with the reserved extents. For instance, application 110 may provide a unique identifier that enables its companion encryption driver to recognize that it owns the reserved extents allocated on its behalf. CBSI module 118 may associate the unique identifier with data to locate the reserved extents when they are created for the encryption driver.

Allocation of reserved extents is communicated to the plurality of volume drivers (block 210). In the continuing example, CBSI module 118 may communicate a location of reserved extents allocated to the encryption driver through the driver stack. In this example, assume the driver stack is arranged to include the snapshot driver, write aggregation driver, and encryption driver in order from the upper level to the lower level of the stack. The reserved extents allocated to the encryption driver in this example may be associated with a unique identifier as noted above. Additionally, each driver may maintain data that describes is corresponding reserved extents (e.g., a reserved extent list) and a list of excluded extents corresponding to the other drivers (e.g., an exclusion list). Further discussion of techniques and CBSI rules 128 employed to maintain reserved extent and exclusion lists may be found in relation to the following figures.

Accordingly, CBSI module 118 may communicate the location of the reserved extents along with the unique identifier down the driver stack through the driver interface 120. In an implementation, the communication may be configured as an add-record command according to IOTCL. A volume storage driver 116 that does not recognize the unique identifier may pass the add-record command on to volume storage drivers 116 lower in the driver stack. When a lower-level volume storage driver 116 completes the add-record command, upper-level volume storage drivers 116 that passed the add-record command along may add the location of the reserved extent to their exclusion lists. A volume storage driver 116 that does recognizes the unique identifier may determine that it owns the record, e.g. the reserved extents of the record correspond to driver. Accordingly, the volume storage driver 116 may add the location of the corresponding reserved extent to it reserved extents list and complete the add-record command.

In the above example, the volume snapshot and write aggregation drivers may not recognize the unique identifier. Accordingly both drivers may pass the communication from the CBSI module 118 down-level to the encryption driver. Encryption driver may recognize the unique identifier as its own. Thus, encryption driver may add the location of the reserved extent to its reserved extent list and send notification back up the driver stack. Based on the notification, volume snapshot and write aggregation drivers may understand that the encryption driver has added to its reserved extents. Accordingly, these drivers may include the location of the reserved extents in their respective exclusion lists. In this manner, volume storage drivers 116 in the driver stack may be made aware of their corresponding reserved extents and may also be made aware of reserved extents corresponding to other volume storage drivers 116.

Figure 3:
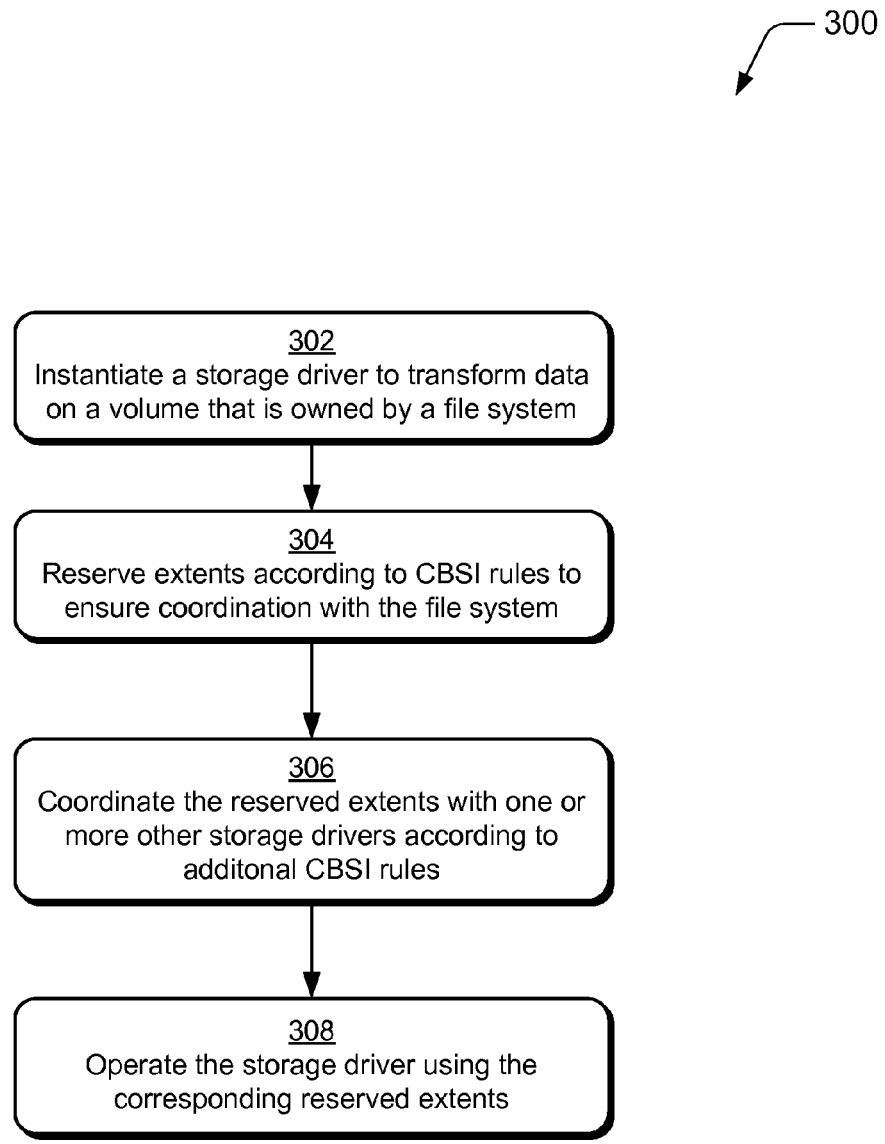
FIG. 3 depicts an example procedure in which common block infrastructure techniques are employed to reserve and coordinate extents of a volume.
Figure 4:
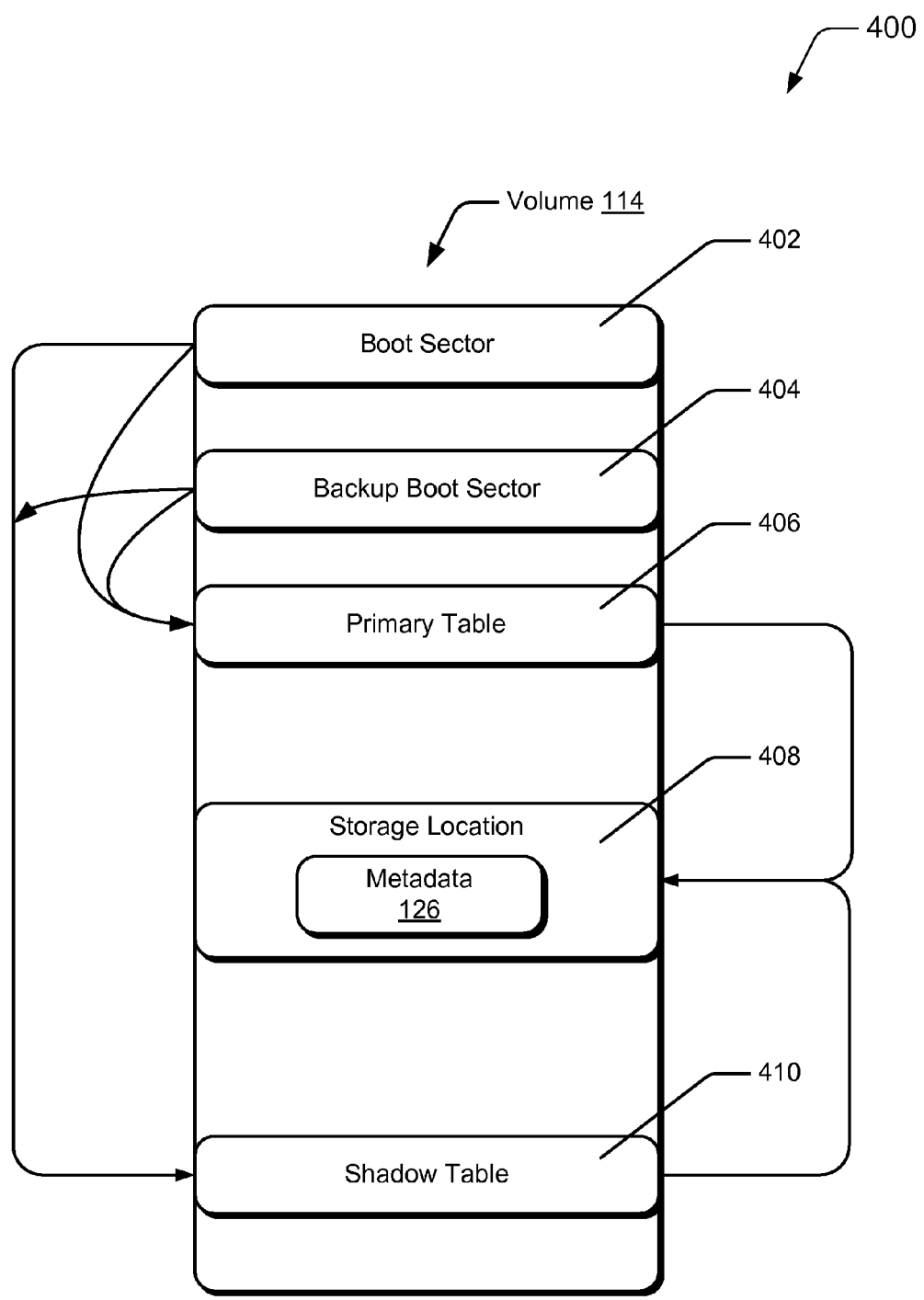
FIG. 4 depicts an example volume layout in accordance with common block storage infrastructure techniques.

FIG. 3 depicts an example procedure 300 in which CBSI rules are employed to reserve and coordinate extents of a volume. In the discussion of procedure 300, reference may be made to the example layout 400 for volume 114 as depicted in FIG. 4. A volume storage driver is instantiated to transform data on a volume that is owned by a file system (block 302). For example, a driver stack represented by volume storage drivers 116 of FIG. 1 may be instantiated to transform data on a volume 114 that may be defined in memory 106 of a computing device 102. The driver stack may reside logically on top of the volume 114 and below the file system 112.

Extents are reserved according to CBSI rules to ensure coordination with the file system (block 304). For example, CBSI module 118 may be invoked to reserve extents for the volume storage drivers 116 of the driver stack. The reserved extents enable the volume storage drivers 116 to store metadata 126 related to operations that they perform on the volume. Each driver may have corresponding reserved extents in the volume 114.

Further, CBSI compliant components, including the volume storage drivers 116, may be configured to adhere to CBSI rules 128 for reserving extents from the file system 112. The CBSI rules 128 may ensure that: allocation of space on the volume 114 is coordinated with the file system 112, CBSI compliant components interoperate, volume storage drivers 116 may discover their own reserved extents, and volume storage drivers 116 may be made aware of the reserved extents of other volume storage drivers 116. The CBSI rules 128 provide a common infrastructure for compliant drivers so that CBSI module 118 may act as a central interface for each of the volume storage drivers 116. At least some of the CBSI rules 128 are implemented through the CBSI module 118 when reserving extents on behalf of the volume storage drivers 116.

A variety of CBSI rules 128 are contemplated. Examples of CBSI rules 128 to which volume storage drivers 116 adhere include: storing location of reserved extents (e.g., maintaining a reserved extent list), implementing countermeasures to prevent a down-level operating system from mounting the volume 114, and virtualization of a boot sector of the volume to upper-level drivers. Storing location of reserved extents enables volume storage drivers 116 to discover their reserved extents at start-up, when the driver stack is formed, and/or when a driver comes "online". In an implementation, this involves storing a location of and/or pointers to the reserved extent list in sector zero of the volume 114, e.g., the boot sector.

Each volume storage driver 116 may modify the boot sector so that, from the driver's standpoint, the volume storage driver 116 recognizes the boot sector and may act as if it owns the volume 114. The volume storage drivers 116 may then use information included in the boot sector (e.g., pointers) to discover their corresponding reserved extents. It is to be noted that the boot sector is used broadly herein to represent a variety of suitable sectors of the volume that may be used to facilitate volume recognition/discovery without limitation. In general, the boot sector as used herein may represent a known region on the volume 114 that stores data used to bring the volume 114 "online" and to mount the file system 112. In an implementation, the boot sector may correspond to sector zero of the volume. However, it is contemplated the a variety of different boot regions or volume recognition regions of a volume may be employed with the CBSI techniques described herein without departing from the spirit and scope thereof. For example, a volume recognition sequence may be stored in a sector other than sector zero, such as using a offset of 32 KB or other known offset. The modification of the boot sector (and/or other equivalent region of the volume 114) also acts a countermeasure that prevents a down-level operating system from recognizing the volume 114 as it own. Further, a copy of the unmodified boot sector may be stored and presented to upper-level volume storage drivers 116 when a boot sector read is detected. In other words, the boot sector (and/or other equivalent region of the volume 114) may be virtualized to upper-level components.

CBSI module 118 may implement additional CBSI rules 128 to: pin files that are created to protect reserved extents at locations in the volume 114, to participate in operations of the file system 112 (e.g., mount, dismount and lock), and to disable volume storage drivers 116 in some circumstances. These CBSI rules ensure that the file system 112 may recognize the volume 114 and operate on the volume 114, without interference from operations performed by the volume storage drivers 116. Additional details regarding these and other CBSI rules 128 to ensure coordination with the file system 112 are discussed in relation to FIGS. 4-5 below.

The reserved extents are coordinated with one or more other storage drivers according to the CBSI rules (block 306). As discussed previously, each volume storage driver 116 may expose an IOTCL interface or other suitable inter-driver interface 124 to enable communication among the drivers. A variety of CBSI rules 128 to coordinate reserved extents between the volume storage drivers 116 may be implemented. In general, the CBSI rules 128 to coordinate with other volume storage drivers 116 define techniques to enable a volume storage driver 116 to discover corresponding reserved extents, become aware of reserved extents of the other volume storage drivers 116, and to avoid/handle conflicts with respect to reserved extents. Further details regarding various CBSI rules 128 to coordinate reserved extents between volume storage drivers 116 are discussed with respect to FIGS. 4-5 below.

The storage driver is operated using the corresponding reserved extents (block 308). For example, operation of a volume storage driver 116 may begin when the driver stack is formed (e.g., at start-up) or when the volume storage driver 116 is inserted into the driver stack at another time. As noted, the volume storage driver 116 is configured to discover its reserved extents when the driver comes "online". Accordingly, the volume storage driver 116 may retrieve metadata 126 stored in its reserved extents and use the metadata 126 to operate on the volume 114.

FIG. 4 is a diagram depicting an example layout 400 that may be employed in accordance with common block storage infrastructure techniques. The example layout 400 illustrates the volume 114 as it appears to one volume storage driver 116. In the illustrated example, volume 114 includes a boot sector 402, a backup boot sector 404, and a primary table 406. The primary table 406 may include pointers to one or more storage locations 408 in the volume 114 for metadata 126. For simplicity sake, FIG. 4 depicts one representative storage location 408 (e.g., one extent) that may be allocated to one volume storage driver 116. However, it is noted that each volume storage driver 116 may have multiple storage locations 408 that are allocated in the volume 114 to store their corresponding metadata 126. A shadow table 410 may also be included to provide a backup in case the primary table 406 becomes corrupted. The shadow table 410 may also include pointers to storage location 408 for metadata 126. To enable a volume storage driver 116 to locate metadata 126, the boot sector 402 may include pointers to the primary table 406 and the shadow table 410, which in turn include pointers to the storage location 408 having the metadata 126.

As noted, volume storage drivers 116 may be configured to function before the file system 112 is mounted, e.g., before the file system comes "online". For instance, volume storage drivers 116 may operate to transform data (e.g., service input and output (I/O)) while the driver stack is being formed. The volume storage drivers 116 may use metadata 126 stored in their corresponding reserved extents to perform these operations. Since the file system 112 is "offline" at this time, volume storage drivers 116 may be configured to locate their metadata 126 on their own. In other words, volume storage drivers 116 may be configured to discover their corresponding reserved extents. Accordingly, a CBSI compliant driver may be configured to store a location of reserved extents (e.g., maintain a reserved extent list) at a known offset, such as in the primary table 406 illustrated in FIG. 4.

As noted, a volume storage driver 116 may modify the boot sector 402 so that from its standpoint, the volume storage driver 116 recognizes and acts as if it owns the volume storage 114. The unmodified boot sector 402 may then be stored and virtualized to other components. For instance, to virtualize the boot sector 402, a volume storage driver 116 may maintain a copy of the unmodified boot sector 402 and/or the backup boot sector 404 in a known location. By way of example, a copy of the boot sector 402 may be stored in the primary table 406. A backup of the boot sector 402 may also be stored in the shadow table 410. Additionally or alternatively, the boot sector 402 may be stored at a suitable known offset location other than the primary table 406.

When an upper-level volume storage driver 116 interacts with a lower-level volume storage driver 116, the lower-level volume storage driver 116 presents the unmodified boot sector 402 that it has stored to the upper-level volume storage driver 116. Virtualization of the boot sector 402 in this manner may persist at each level in the driver stack of volume storage drivers 116. Accordingly, the unmodified boot sector 402 may be preserved (e.g. exposed at each level in the driver stack) and presented to the file system 112, while each of the plurality of volume storage drivers 116 may use the boot sector 402 to store information to discover corresponding reserved extents and to retrieve metadata 126 that has been stored in the reserved extents.

As noted above, the CBSI Rules 128 may include rules implemented by CBSI module 118. For instance, CBSI module 118 may pin storage locations 408 that are allocated to volume storage drivers 116 through the file system 112. In particular, CBSI module 118 may pin handles to the files that are created to protect reserved extents so that they remain in the same location, e.g., physically the same location on the volume 114. This ensures that the files do not move during operations that may reorganize the volume 114, such as defragmentation. The pinning is performed so that the locations used by volume storage drivers 116 to locate their metadata 126 without the file system 112 being "online" are accurate and point to the correct data in the volume 114.

Further, CBSI module 118 participates in operations of the file system 112. Since the file system 112 is used to protect the reserved extents, CBSI module 118 opens files and pins handles when the volume is mounted 114, e.g., when the file system 112 comes "online". During a start-up sequence, CBSI module 118 may send a get-record command down the driver stack, such as through the driver interface 120 and/or the inter-driver interfaces 124. The volume storage drivers 116 may respond by reporting their reserved extent lists to the CBSI module 118. CBSI module 118 may then protect these reserved extents through the file system 112. When operations such as dismount or lock occur, CBSI module 118 may close the files and/or release the pins to avoid interference with the file system 112. During these times the reserved extents, may be unprotected. However, CBSI module 118 is able to re-protect the files when the lock is complete and/or during the next mount operation, in the manner previously described.

Likewise, CBSI module 118 may implement rules to disable volume storage drivers 116 under some circumstances. CBSI module 118 provides a mechanism to cause a volume storage driver 116 to stop operating on the volume 114 on the behalf of a companion application 110. In an implementation, CBSI module 118 may send a delete-extents IOCTL command to the plurality of volume storage drivers 116. The volume storage driver 116 that corresponds to (e.g., "owns") those extents may undo any modifications to the boot sector 402 to restore the original version of the boot sector 402 and stop operating on the volume 114. CBSI module 118 may then interact with the file system 112 to close the files protecting the corresponding reserved extents. In one example, an encryption driver may be disabled when a request is received to cause a volume 114 to be converted from an encrypted drive to an unencrypted drive.

Additionally, the CBSI rules 128 may also include rules to coordinate with other volume storage drivers. These rules may define techniques to enable a volume storage driver 116 to discover corresponding reserved extents that it owns, become aware of reserved extents of other volume storage driver 116, and avoid/handle conflicts with respect to reserved extents.

An example a CBSI rule 218 may be implemented to cause that volume storage drivers 116 to virtualize the boot sector 402 to upper-level drivers when the boot sector 402 as read from a lower level on the stack matches a format expected by volume storage driver 116. In other words, when the volume storage driver 116 receives its own modification of the boot sector 402, the volume storage driver 116 may virtualizes the boot sector 402 to upper levels as discussed in relation to FIG. 4. When the volume storage driver 116 does not recognize the boot sector 402 from below, the volume storage driver 116 may provide the boot sector 402 to upper-level drivers without virtualization.

For example, when a volume storage driver 116 is missing from the stack, this may lead to a lower-level volume storage driver 116 providing an incorrectly virtualized boot sector to the next higher level volume storage driver 116 of the driver stack. In this case, the higher-level driver does not see the format expected and returns the boot sector without virtualization up the stack. This CBSI rule 128 ensures that the file system 112 does not recognize the volume when the driver stack is incomplete. The file system 112 will see a boot sector it may not understand and the volume 114 will not mount.

According to other CBSI rules 128, volume storage drivers 116 may be configured to: notify upper-level drivers of reserved extents, handle queries to discover reserved extents (e.g., from CBSI module 118 and/or other volume storage drivers 112), and avoid initiating I/O for the reserved extents corresponding to lower-level drivers. Notification to upper-level drivers may be performed at startup, when a driver comes online. To avoid conflicts, notification may occur before the driver writes to its extents. The notification permits upper-level driver to dynamically build their exclusion lists. Further, upper-level drivers may make queries to discover the reserved extents of lower-level drivers. Volume storage drivers 116 are configured to receive these queries and respond with their list of reserved extents.

Consider a write aggregation driver that may be inserted into the middle of the driver stack. A companion application 110 may request reserved extents through the CBSI module 118 as discussed with respect FIG. 2. When the write aggregation driver completes a get record command sent by CBSI module 118 to communicate allocation of the reserved extents, the write aggregation driver may send notification up the driver stack. Upper-level volume storage drivers 116 receiving the notification may then add the corresponding reserved extents to their exclusion lists. The write aggregation driver may also query lower-level volume storage drivers 116 to discover their corresponding reserved extents. In response to the querying, the write aggregation driver may receive lists of reserved extents from the lower-level volume storage drivers 116, which the write aggregation driver may use to dynamically build its exclusion list defining excluded extents.

Further, CBSI compliant drivers are configured to avoid operations on the reserved extents of lower-level drivers, e.g., the excluded extents. Thus, volume storage drivers 116 may use an exclusion list that is dynamically built through the queries and notifications as previously discussed to avoid operating on reserved extents corresponding to other drivers. The volume storage drivers 116 may be further configured to pass-through I/O directed to excluded extents without transformation.

Additional CBSI rules 128 relate to handling of requests that may be made for a driver's reserved extents. While compliant drivers may be configured to avoid sending I/O to reserved extents, I/O to reserved extents may occur when volume storage drivers 116 higher in the stack are non-compliant with CBSI. Drivers may employ a variety of techniques to handle reads or writes to reserved extents. One technique is to return zeros for reads and allow writes of zero to succeed. Non-zero writes may be dealt with separately and the techniques to do so may vary. For example, one driver may transition into a disabled state to enable the write, another may fail the write, and yet another may discard the write. A variety of other techniques to handle non-compliant I/O to reserved extents are contemplated.

Accordingly, CBSI compliant drivers may be configured according to a variety of CBSI rules 128 including rules to coordinate reserving of extents with the file system 112 and rules to coordinate operation of the plurality of volume storage drivers 116.

Figure 5:
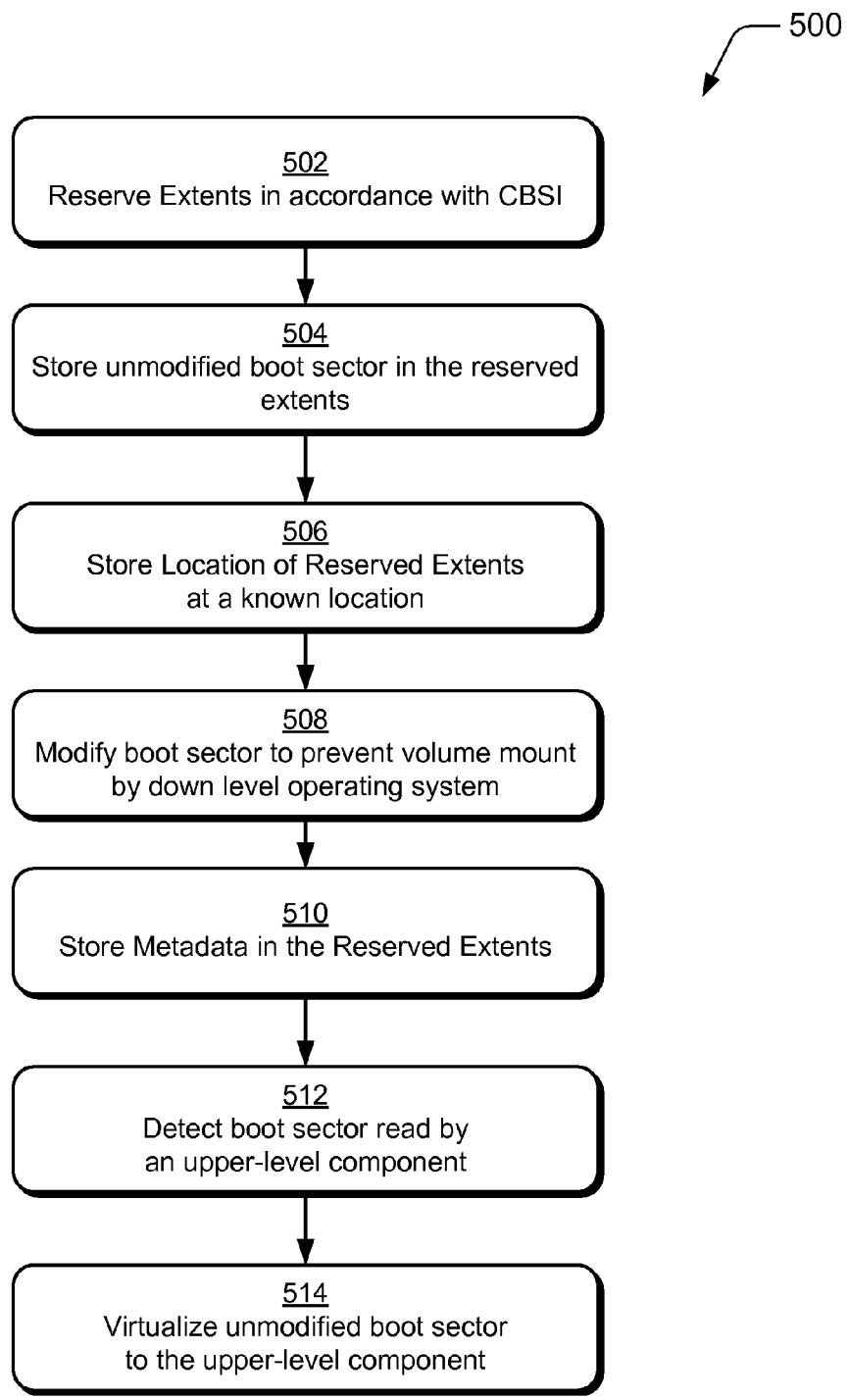
FIG. 5 depicts an example procedure in which a storage driver employs common block storage infrastructure techniques to virtualize a boot sector.

FIG. 5 depicts an example procedure 500 in which a storage driver employs common block storage infrastructure techniques to virtualize a boot sector. In the discussion of procedure 500, reference may be made to the example layout 400 for volume 114 as depicted in FIG. 4. Extents are reserved in accordance with CBSI (block 502). For instance, CBSI module 118 may operate to reserve extents for a plurality of volume storage drivers 116 as discussed in relation to procedure 200 of FIG. 2. The reserved extents may be created, managed, and coordinated in accordance with the variety of CBSI rules 128 as previously described. Referring again to the example of FIG. 4, reserving extents may include reserving space in the volume 114 for the primary table 406 and the shadow table 410. Thus, the primary table 406 and the shadow table 410 are included as reserved extents that correspond to a volume storage driver 116.

An unmodified version of a boot sector is stored in the reserved extents (block 504). For example, the reserved extents allocated through the CBSI module 118 may correspond to an encryption driver that operates on volume 114 to encrypt/decrypt data. The encryption driver may store the unmodified boot sector 402 for later retrieval. In particular, the unmodified boot sector may be stored within the reserved extents corresponding to encryption driver. In an implementation, the unmodified boot sector 402 may be stored in the primary table 406 or at another suitable location in the volume 114. Naturally, another copy of the unmodified boot sector 402 may be stored in the shadow table 410. Thus, the original boot sector 402 may be maintained within the reserved extents corresponding to a volume storage driver 116.

A location of the reserved extents is stored at a known location (block 506). For instance, the encryption driver may maintain a reserved extents list describing its corresponding reserved extents at a known location in the volume 114. As noted in the preceding discussion, storing the location of reserved extents may enable volume storage drivers 116 to discover their reserved extents when the file system 112 is offline. For example, the boot sector 402 or equivalent volume recognition region of the volume 114 may be used to store data to facilitate discovery of reserved extents by volume storage drivers 116. In an implementation, the boot sector 402 may be configured to include pointers to a primary table 406 that in turn maintains a reserved extent list and pointers to the storage location 408 of metadata 126 may be maintained. A shadow table 410 may also include a copy of the reserved extent list and pointers to the storage location 408 as a backup to the primary table 406. Thus, the location of the reserved extents list (e.g., the primary table 406) and accordingly the metadata 126 may be discoverable by the encryption driver through the boot sector 402 when the volume storage driver 116 comes "online".

The boot sector is modified to prevent volume mounting by a down-level operating system (block 508). For instance, encryption driver may overwrite the boot sector 402 illustrated in FIG. 4 with its own data. Thus, encryption driver may create its own version of the boot sector 402. As noted previously, the boot sector 402 may be sector zero and/or another suitable sector of the volume 114 configured to facilitate volume recognition. This modification of the boot sector 402 may include adding pointers to locate the primary table 406 and through the primary table the storage location 408 having the metadata 126. The boot sector 402 may also point to the shadow table 410. Further, a backup boot sector 404 may also be maintained at a fixed offset from the boot sector 402 in case the boot sector 402 is corrupted. The modified boot sector 402 may be unrecognizable to the file system 112. Accordingly, this may prevent a down-level operating system from mistakenly recognizing the volume 114 as it own and attempting to mount the volume 114. Further, the modification may also prevent volume mount when the driver stack is incomplete, such as when the volume storage driver 116 that made the modification is corrupted, missing, or otherwise unavailable.

Metadata is stored in the reserved extents (block 510). For instance, the encryption driver in the above example may store metadata 126 that may be employed to encrypt and decrypt data on the volume 114 in its corresponding reserved extents. For instance, the encryption driver may store metadata 126 in a storage location 408 as illustrated in FIG. 4. The encryption driver may detect its reserved extents, retrieve metadata 126, and operate on the volume 114 at start-up or when the encryption driver otherwise comes "online".

A boot sector read by an upper-level component is detected (block 512). For example, a write aggregation driver residing logically above the encryption driver in the driver stack may communicate a boot sector read down to the encryption driver. Responsive to the boot sector read, the unmodified boot sector is virtualized to the upper-level component (block 514). For instance, when the encryption driver receives the boot sector read from the write aggregation driver, the encryption driver provides the unmodified boot sector 402 that is located in the primary table 406 to the write aggregation driver. This may include redirection of the read to the primary table 406 based on the pointers included in the modified version of the boot sector 402.

Each volume storage driver 116 may virtualizes the boot sector 402 (and/or other equivalent sector) to the components above it, e.g., higher up the stack. By doing so each component (e.g., volume storage driver 116, CBSI module 116, file system 112) recognizes the volume 114 as being its own and may operate on the volume 114 accordingly. A computing device 102 that does not include the driver stack to correctly virtualize the boot sector 402 to the file system 112 may be unable recognize the volume 114. The virtualization allows each volume storage driver 116 to locate its metadata 126 using its own implementation of the boot sector 402. Moreover, the volume storage drivers 116 may discover, manage, and coordinate reserved extents according to the variety of CBSI Rules 128 and retrieve their metadata 126 to operate on the volume 114. Accordingly, volume storage drivers 116 may use the common block storage infrastructure techniques described herein to discover, manage, and coordinate reserved extents before the file system 112 comes online.

CONCLUSION

Although the common block storage infrastructure techniques have been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. One or more computer-readable memory devices storing instructions executable by a computing device to:
receive a request from an application to allocate reserved extents on a volume owned by a file system for one of a plurality of volume storage drivers configured to form a driver stack between the file system and the volume;
interact with the file system to cause allocation of the reserved extents in accordance with a common block storage infrastructure by creating files through the file system to protect the reserved extents for use by the plurality of volume storage drivers; and
communicate the allocation of the reserved extents through the driver stack having the plurality of volume storage drivers by sending a notification of the reserved extents through the driver stack having an identifier associated with the one said volume storage driver that enables drivers in the stack that do not recognize the identifier to pass the notification down the stack for recognition by the one said volume storage driver, each particular driver of the plurality of volume storage drivers configured to maintain a list of reserved extents for the particular driver and an exclusion list that indicates reserved extents allocated to other drivers of the plurality of volume storage drivers.

2. One or more computer-readable memory devices as recited in claim 1, wherein the instructions are further executable to:
expose a first interface operable by the application to request the allocation of the reserved extents; and
expose a second interface operable to communicate the allocation of the reserved extents to the plurality of volume storage drivers.

3. One or more computer-readable memory devices as recited in claim 2, wherein the common block storage infrastructure defines a plurality of rules to ensure coordination with the file system and to coordinate the reserved extents between the plurality of volume drivers.

4. One or more computer-readable memory devices as recited in claim 1, wherein the instructions are further executable to:
request records from each of the plurality of volume storage drivers that describe corresponding reserved extents;
receive the requested records from the plurality of volume storage drivers; and
create files via the file system to protect the corresponding reserved extents described by the received records.

5. One or more computer-readable memory devices as recited in claim 1, wherein allocation of the reserved extents includes creating handles to pin locations of the files created to protect the reserved extents in the volume.

6. One or more computer-readable memory devices as recited in claim 5, wherein the instructions are further executable to close the one or more files and release the handles to pin the locations of the files when the file system dismounts the volume.

7. One or more computer-readable memory devices as recited in claim 5, wherein the instructions are further executable to close the one or more files and release the handles to pin the locations of the files when the file system locks the volume.

8. One or more computer-readable memory devices as recited in claim 1, wherein communicate the allocation of the reserved extents comprises sending an input output control (IOCTL) command to the plurality of volume storage drivers.

9. A method comprising:
instantiating a volume storage driver to transform data on a volume that is owned by a file system;
reserving extents on the volume for the volume storage driver according to common block storage infrastructure (CBSI) rules to coordinate with the file system; and
coordinating the reserved extents with one or more other volume storage drivers configured to form a driver stack between the file system and the volume according to the CBSI rules; including:
recognizing a notification sent down the driver stack based on a identifier included in the notification that is associated with the volume storage driver and configured to cause drivers that do not recognize the identifier to pass the notification down the driver stack, the notification indicative of the reserved extents on the volume for the volume storage driver;
responsive to recognizing the notification:
adding a location of the reserved extents indicated by the notification to a reserved extents list for the volume storage driver; and
sending an indication of the recognition back up the stack to notify one or more upper-level drivers of said one or more other storage drivers of the reserved extents corresponding to the volume storage driver and enable the one or more upper-level drivers to add the location of the reserved extents to respective exclusion lists; and
maintaining by the volume storage driver of a list of reserved extents to provide in response to a query from the upper-level driver and a list of excluded extents associated with lower-level drivers of said one or more other volume storage drivers.

10. A method as recited in claim 9, wherein coordinating the reserved extents with the one or more other volume storage drivers further comprises:
querying by the volume storage driver of a lower-level driver of said one or more other volume storage drivers to determine excluded extents; and
building the list of the excluded extents determined through the querying.

11. A method as recited in claim 9, wherein coordinating the reserved extents with the one or more other storage drivers according to the CBSI rules includes virtualizing a boot sector of the volume to an upper-level driver of said one or more other storage drivers when a boot sector read from a lower-level driver of said one or more other storage drivers is in an expected format.

12. A method as recited in claim 9, wherein reserving extents includes:
creating files through the file system to protect the reserved extents in the volume; and
pinning the files to prevent the file system from moving locations of files on the volume.

13. A method as recited in claim 9, wherein reserving extents according to common block storage infrastructure (CBSI) rules includes:
storing a location of the reserved extents to enable discovery by the volume storage driver;
modifying a boot sector of the volume to prevent mounting of the volume by a down-level operating system; and
virtualizing an unmodified version of the boot sector to the one or more other storage drivers to enable the file system to obtain the unmodified version of the boot sector.

14. A method as recited in claim 13, wherein storing a location of the reserved extents includes storing pointers to the reserved extents in a primary table on the volume and configuring the modified boot sector to include pointers to the primary table.

15. A method as recited in claim 9, wherein to coordinate the reserved extents with the one or more other volume storage drivers, the volume storage driver is configured to:
discover reserved extents that are allocated to the volume storage driver when the volume storage driver is instantiated; and
notify the one or more other volume storage drivers of the discovered reserved extents.

16. A computing device comprising:
a processor;
memory;
a volume defined in the memory;
an operating system to implement a file system for the volume; and
a plurality of drivers configured to:
form a driver stack between the volume and the file system;
virtualize a boot sector of the volume successively up the driver stack to the file system;
store metadata to enable operations on the volume in reserved extents each corresponding to one of the plurality of drivers;

discover the reserved extents on the volume to retrieve the metadata; and communicate one to another to coordinate the reserved extents between the plurality of drivers, each respective driver of said plurality of drivers is configured to:

process notifications of reserved extents sent down the driver stack to recognize notifications corresponding to the respective driver based on identifiers included in the notifications;

pass notifications that are not recognized down the stack for processing by lower level drivers in the driver stack; and responsive to recognition of a notification having an identifier corresponding to the respective driver:

add a record for reserved extents indicated by the notification to a list of reserved extents for the respective driver; and send a notification back-up the stack to enable upper-level drivers to add the reserved extents for the respective driver to respective exclusion lists.

17. A computing device as recited in claim 16, wherein to coordinate the reserved extents between the plurality of drivers, each respective driver of said plurality of drivers is further configured to:

maintain a-the list of said corresponding reserved extents of the respective driver;

discover the corresponding reserved extents when the driver stack is formed;

notify upper-level said drivers in the driver stack of the corresponding reserved extents; and query lower-level said drivers in the driver stack to receive notification of said reserved extents corresponding to the lower-level said drivers.

18. A computing device as recited in claim 16, further comprising a common block storage infrastructure module stored in the memory and executable via the processor to:

receive requests from applications of the computing device to allocate the reserved extents in the volume for the plurality of drivers;

interact with the file system to cause allocation of the reserved extents; and communicate the allocation of the reserved extents to the plurality of drivers.

* * * * *